Figure 1:
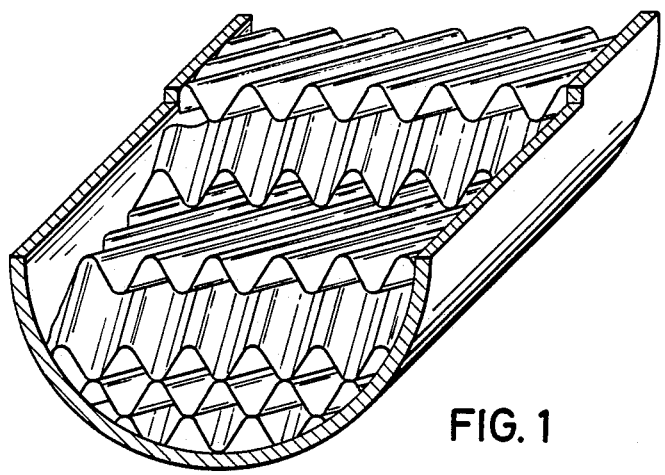

United States Patent [19]

Driscoll et al.

[11] Patent Number: 4,968,833
[45] Date of Patent: Nov. 6, 1990

[54] PROCESS FOR THE PREPARATION OF A GLYOXYLIC ACID ESTER

[75] Inventors: Robert K. Driscoll, Frankfurt am Main; Ernst I. Leupold, Neu-Anspach; Wolfgang Ebertz, Wesseling; Friedrich Wunder, Flörsheim am Main, all of Fed. Rep. of Germany

[73] Assignee: Hoechst Aktiengesellschaft, Frankfurt am Main, Fed. Rep. of Germany

[21] Appl. No.: 690,744

[22] Filed: Jan. 11, 1985

[30] Foreign Application Priority Data

Jan. 14, 1984 [DE] Fed. Rep. of Germany ....... 3401115

[51] Int. Cl.$^5$ .................... C07C 67/313; C07C 69/67
[52] U.S. Cl. .................................. 560/177; 502/243; 502/247; 502/263; 502/527
[58] Field of Search ......................... 560/177; 562/577; 502/243, 247, 527, 263

[56] References Cited

U.S. PATENT DOCUMENTS

| 3,347,798 | 10/1967 | Baer et al. | 502/9 |
| 3,898,180 | 8/1975 | Crooks et al. | 502/240 |
| 4,273,681 | 6/1981 | Nonnenmann . | |
| 4,340,748 | 7/1982 | Baltes et al. | 562/577 |

FOREIGN PATENT DOCUMENTS 0008013 7/1979 European Pat. Off. .
2902779 7/1980 Fed. Rep. of Germany .

*Primary Examiner*—Vivian Garner
*Attorney, Agent, or Firm*—Curtis, Morris & Safford

[57] ABSTRACT

The invention relates to a process for the preparation of a glyoxylic acid ester by oxydehydrogenation of the corresponding glycolic acid ester in the gas phase over a supported catalyst in a tubular reactor. The catalyst support consists of at least one cylindrical monolith which essentially has the same diameter as the reactor tube and contains channels with a diameter of 1 to 10 mm leading from the inlet to the outlet of the reactor tube. 60 to 90% of the monolith volume is formed by hollow spaces.

12 Claims, 1 Drawing Sheet

U.S. Patent     Nov. 6, 1990     4,968,833

PROCESS FOR THE PREPARATION OF A GLYOXYLIC ACID ESTER

It is known from German Patent No. 2,904,775 and German Offenlegungsschrift No. 3,323,372 that glycolic acid esters can be oxydehydrogenated to glyoxylic acid esters over heterogeneous catalysts in the gas phase. This reaction is exothermic, and a large amount of heat is also released by the total oxidation to $CO_2$ and water which occurs as side or subsequent reactions. The reactor tube packed with granular supported catalyst which is usually employed in general therefore has a relatively small diameter in order to allow good removal of heat. To suppress undesirable subsequent reactions, the reaction is in general carried out with short residence times of 0.05 to 1.0 second. Such residence times are achieved with a high gas throughput. In addition, large amounts of inert carrier gas, for example nitrogen, must be fed into the reactor in order to keep the oxygen content in the gas phase below the explosion limit and to transfer the heat of reaction released to the cooled reactor wall, from the catalyst. This combination of a narrow tube and a high gas throughput leads to considerable pressure losses in a catalyst bed consisting of granular material. In practice, the dilution gas (about 95% of the gas phase) is passed in circulation. The high pressure loss means that there is a high expenditure on compression work so that the dilution gas can be re-used. The aim of the present invention is to overcome this disadvantage.

The present invention accordingly relates to a process for the preparation of a glyoxylic acid ester by oxydehydrogenation of the corresponding glycolic acid ester in the gas phase over a supported catalyst in a tubular reactor, wherein the catalyst support consists of at least one cylindrical monolith, the monolith essentially having the same diameter as the reactor tube and containing channels 1 to 10 mm in diameter which lead from the inlet to the outlet of the reactor tube, and wherein 60 to 90% of the volume of the monolith is formed by hollow spaces.

A "monolith" is defined here as a lump of support of ceramic material containing channels. The channels can run parallel or at an angle to the axis of the reactor tube. They preferably have a diameter of 1-5 mm.

Preferably, several cylindrical monoliths are arranged one after the other or are stacked one on top of the other in the reactor tube, since this is easier than to produce and install a single monolith of the same length as the reactor tube. These cylinders can in turn be composed of individual segments.

Monoliths with channels which run parallel to the axis of the reactor tube have hitherto already been used for the detoxification of motor waste gases (Ullmann, Encyklopädie der technischen Chemie (Encyclopedia of Industrial Chemistry), Volume 13, page 561). Such monoliths can also be employed in the present process. The channels can have a circular or angular cross-section here; in the case of an angular cross-section, "honey-combed substances" are also referred to. Such a monolith with channels parallel to the axis of the reactor removes little heat of reaction. To avoid overheating, the reaction tube will therefore preferably be divided into several reaction zones filled with monolith and cooling zones will be incorporated between the reaction zones (hurdle reactor).

Monoliths with channels, most of which do not run parallel to the axis of the reactor tube but form an angle of 20° to 70° with the axis are preferably used in the process according to the invention. The channels of the monolith or monoliths must match one another so that the gas employed can flow from the inlet of the reactor tube to the outlet since, because of the slant of the channels in relation to the axis of the reactor, the gases impinge on the reactor wall and it must of course be ensured that from there they can flow further through another channel. The same applies to the transition from one monolith to another or from one monolith segment to another. In other words: the channel structure of the total catalyst must in all cases be such that the gases can pass from the inlet to the outlet of the reactor tube with a reasonably low resistance. Since the gases impinge on the cooler reactor wall during passage through the catalyst, removal of heat is simpler than in the case of the monoliths with channels parallel to the axis of the reactor. As in the previous case, the channels here can have a circular or angular cross-section.

Of the monoliths mentioned with inclined channels, those which have an ordered, continuously recurring hollow structure in all three spatial directions are particularly preferred. Such structures are already known in so-called "static mixers" (Chem. Ing. Tech. 51 (1979), pages 347-364).

Figure 2:
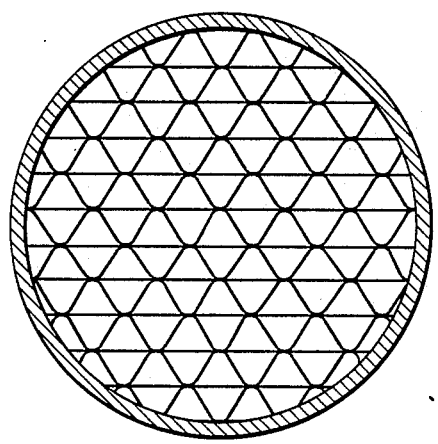

Monoliths with a structure illustrated by FIGS. 1 and 2, which is likewise already known from static mixers, are particularly preferred. Such monoliths, which are designated below as type I monoliths, consist of corrugated layers (i.e. shaped approximately like corrugated sheet) which are arranged parallel to the axis of the reactor and lie one on top of the other, the troughs in subsequent layers alternately forming an angle of $\alpha$ and $-\alpha$ with the axis of the reactor ($\alpha=20°-70°$). The channels formed by the troughs and crests of the layers placed one on top of the other have a triangular cross-section with very round corners. A firm connection exists at each contact site between the corrugated layers placed one on top of the other, so that each monolith element represents a single hollow structure through which run channels. Such monoliths are commercially available under the name "Sulzer-Packung". As mentioned above for the more general case, the monoliths here are also preferably used in the form of several cylinders stacked one on top of the other. The structure described thereby automatically ensures that the channels of the cylinders stacked on top of one another match each other so that the gas used can flow from the inlet of the reactor tube to the outlet.

Surprisingly, the use according to the invention of a monolith support produces a significantly better yield and space/time yield than the conventional use in bulk of spherical catalyst particles. In addition, the monolith packing according to the invention causes a considerably smaller pressure loss than spheres used in bulk.

Compared with the use of a bed of spheres, the use, according to the invention, of monoliths has the following further advantages: installation and change of the catalyst are facilitated to a considerable degree, since the catalyst bed consists of only a few components. In addition, the wear of the active components is substantially reduced.

Suitable ceramic materials for the monoliths are silicates, aluminum oxides, aluminum silicates or silicon carbide, preferably with surface areas, measured by the BET method, of less than 50 $m^2g^{-1}$. Monoliths which predominantly consist of aluminum silicate are particularly preferred.

In principle, all the elements which are suitable for oxydehydrogenation reactions can be used as the catalytically active components. However, the catalyst preferably contains at least one of the elements V, Au, Mo, Ag, Cu, Sn, Sb, Bi and P. Other elements of main groups 3 to 5, however, also exhibit a catalytic action.

The elements mentioned are introduced into the reaction zone either in metallic form or in the form of their compounds, for example as oxides, nitrates, acetates, acetylacetonates, oxalates, citrates or halides.

The total amount of elements on the support can vary within wide limits. In general, it is 0.01 to 50% by weight, preferably 0.1 to 20% by weight, based on the total weight of the supported catalyst. The catalytically active components are advantageously introduced onto the support in the form of a solution, the solvent is then evaporated off and the catalyst is dried. Solvents which are used are in general water, hydrochloric acid, nitric acid, alkali metal hydroxide solutions or aqueous ammonia solution, preferably water or hydrochloric acid.

It has proved advantageous to pass an oxidizing gas, in particular oxygen or air, or a reducing gas, in particular hydrogen or hydrogen diluted with inert gas, over the catalyst at temperatures of 100° to 800° C., in particular 300° to 600° C., before the glycolic acid ester is introduced into the reaction zone.

Glycolic acid esters of the general formula HO—CH$_2$—COOR are employed in vapor form in the process according to the invention.

In this formula, R is a hydrocarbon radical, preferably an aliphatic, straight-chain or branched alkyl radical with 1 to 8 carbon atoms, in particular with 1 to 5 carbon atoms.

The gaseous glycolic acid esters are passed over the catalyst together with oxygen or an oxygen-containing gas, such as air. The mixture is preferably diluted with a carrier gas, such as nitrogen or noble gases.

In general, the following amounts of additives are employed per mole of glycolic acid ester in the process according to the invention:

oxygen: 0.1 to 5 moles, preferably 0.5 to 3 moles.
carrier gas: 0 to 200 moles, preferably 30 to 100 moles.

Satisfactory results are also still achieved outside these limits.

The oxydehydrogenation is in general carried out at temperatures between 100° and 600° C., preferably between 200° and 400° C. The residence time is preferably between 0.05 and 10 seconds, but in particular between 0.05 and 1 second. Satisfactory results are also still obtained outside these limits.

The oxydehydrogenation is preferably carried out under normal pressure, but reduced or increased pressures, i.e. 0.01 to 100 bar, can also be applied.

In detail, a procedure is followed in which the glycolic acid ester and oxygen or oxygen-containing gas and, if appropriate, the carrier gas are passed from metering devices into a vaporization zone and the resulting gas mixture is then passed through an externally heated reaction tube filled with the catalyst. It has proved advantageous here to heat up the oxygen or the oxygen-containing gas and the carrier gas to the reaction temperature before introducing them into the reactor.

The following examples are intended to illustrate the invention in more detail.

EXAMPLE 1

The experiment was carried out in a vertical V4A steel tubular reactor 1,500 mm in length and 27 mm in diameter. The reactor was heated externally and the internal temperature was measured with the aid of several thermocouples.

The catalyst support consisted of 9 cylindrical type I monolith pieces in layers one on top of the other. Each piece had a diameter of 26 mm, a length of 50 mm and a channel diameter of about 3 mm. A bore 9 mm in diameter in which the thermocouples for measuring the temperature were fitted passed centrally through the monolith structure. The monoliths consisted of aluminum silicate coated with aluminum oxide and having a surface area, measured by the BET method, of about 20 $m^2g^{-1}$. The catalyst support occupied a volume of 210 ml in the reactor tube. This volume is designated the catalyst volume below.

To prepare the catalyst, 16.4 g of vanadium pentoxide were dissolved in 150 ml of concentrated hydrochloric acid. Each piece of monolith was impregnated by immersion in this solution. The solvent was evaporated off on a steam bath and the monolith was then dried at 110° C. This procedure was repeated until the desired vanadium concentration, i.e. 25.8 g of vanadium per liter of catalyst volume, was achieved.

In the same way, 54.3 g of silver per liter of catalyst volume were applied to the monolith, which had already been impregnated with vanadium, by immersion in a 1.8 molar aqueous solution of silver nitrate.

The activation of the entire catalyst was carried out in a gas stream of 2.4 moles/hour of oxygen and 91.6 moles/hour of nitrogen at 400° C. for three hours.

184.8 ml/hour of methyl glycolate (2.4 moles/hour), 2.4 moles/hour of oxygen and 91.6 moles/hour of nitrogen were simultaneously introduced into a vaporization pot. The entire gas phase was heated up to 275° C. before being introduced into the vertical reactor. The reaction temperature in the reactor tube was also 275° C. After a run-in time of 1 hour to establish constant operating conditions, the experiment was continued over a period of 4 hours.

The following results were obtained:

| | | |
|---|---|---|
| Yield of methyl glyoxylate | = | 82.1% |
| Space/time yield | = | 825.3 g/l.hour |
| Methyl glycolate conversion | = | 94.6% |
| Methyl glycolate selectivity | = | 86.8% |
| Pressure loss in the catalyst bed | < | 1 mbar |

Comparison Example

The catalyst support consisted of aluminum silicate spheres (1 mm in diameter) with a surface area, measured by the BET method, of 1 $m^2g^{-1}$. The catalyst contained 38.5 g of vanadium and 81.1 g of silver per liter of catalyst volume. To prepare the catalyst, 14.4 g of vanadium pentoxide were dissolved in 109 ml of concentrated hydrochloric acid, 210 ml of catalyst were impregnated with this solution and the solvent was evaporated off on a steam bath. In the same way, 26.8 g of silver nitrate were applied, after being dissolved in 43.7 ml of water. The catalyst was then dried at 110° C. The same vertical steel reactor was filled with these 210 ml of catalyst and the catalyst was activated in the same manner as in Example 1.

Exactly as in Example 1, the amounts of reaction gases mentioned in that example were passed through this catalyst in bulk form at the same reaction temperature.

The following results were obtained:

| | | |
|---|---|---|
| Yield of methyl glyoxylate | = | 75% |
| Space/time yield | = | 754.3 g/l.hour |
| Methyl glycolate conversion | = | 87.8% |
| Methyl glycolate selectivity | = | 85.4% |
| Pressure loss in the catalyst bed | = | 360 mbar |

The pressure loss is substantially higher than in Example 1 and the efficiency of the catalyst is somewhat reduced.

We claim:

1. A process for the preparation of a glyoxylic acid ester by oxydehydrogenation of the corresponding glycolic acid ester in the gas phase over a supported catalyst in a tubular reactor, wherein the catalyst support consists of at least one cylindrical monolith, the monolith essentially having the same diameter as the reactor tube and containing channels 1 to 10 mm in diameter which lead from the inlet to the outlet of the reactor tube, and wherein 60 to 90% of the volume of the monolith is formed by hollow spaces.

2. The process as claimed in claim 1, wherein the channels have a diameter of 1-5 mm.

3. The process as claimed in claim 2, wherein several cylindrical monoliths are stacked one on top of the other or arranged one behind the other.

4. A process for the preparation of a glyoxylic acid ester by oxydehydrogenation of the corresponding glycolic acid ester in the gas phase over a supported catalyst in a tubular reactor, wherein the catalyst support consists of at least one cylindrical monolith, the monolith essentially having the same diameter as the reactor tube and containing channels 1 to 10 mm in diameter which lead from the inlet to the outlet of the reactor tube and most of the channels forming an angle of 20° to 70° with the axis of the reactor, and wherein 60 to 90% of the volume of the monolith is formed by hollow spaces.

5. The process as claimed in claim 4, wherein the channels have a diameter of 1-5 mm.

6. The process as claimed in claim 5, wherein several cylindrical monoliths are stacked one on top of the other or arranged one behind the other.

7. A process for the preparation of a glyoxylic acid ester by oxydehydrogenation of the corresponding glycolic acid ester in the gas phase over a supported catalyst in a tubular reactor, wherein the catalyst support consists of at least one cylindrical monolith, the monolith essentially having the same diameter as the reactor tube and containing channels 1 to 10 mm in diameter which lead the inlet to the outlet of the reactor tube, and most of the channels forming an angle of 20° to 70° with the axis the reactor, and wherein 60 to 90% of the volume of the monolith is formed by hollow spaces, and wherein the monoliths have an ordered, continuously recurring hollow structure in all three spatial directions.

8. The process as claimed in claim 7, wherein the channels have a diameter of 1-5 mm.

9. The process as claimed in claim 8, wherein several cylindrical monoliths are stacked one on top of the other or arranged one behind the other.

10. A process for the preparation of a glyoxylic acid ester by oxydehydrogenation of the corresponding glycolic acid ester in the gas phase over a supported catalyst in a tubular reactor, wherein the catalyst support consists of at least one cylindrical monolith, the monolith essentially having the same diameter as the reactor tube and containing channels 1 to 10 mm in diameter which lead from the inlet to the outlet of the reactor tube, and wherein 60 to 90% of the volume of the monolith is formed by hollow spaces, and the monoliths consisting of corrugated layers arranged parallel to the axis of the reactor and lying one on top of the other, the troughs in subsequent layers alternately forming an angle of $\alpha$ and $-\alpha$ with the axis of the reactor and $\alpha$ having a value between 20° and 70°.

11. The process as claimed in claim 10, wherein the channels have a diameter of 1-5 mm.

12. The process as claimed in claim 11, wherein several cylindrical monoliths are stacked one on top of the other or arranged one behind the other.

* * * * *